United States Patent
Becker et al.

(10) Patent No.: US 9,140,377 B2
(45) Date of Patent: Sep. 22, 2015

(54) FLUID FLOW REGULATOR

(71) Applicant: AirSept, Inc., Atlanta, GA (US)

(72) Inventors: Aaron Becker, Atlanta, GA (US); Myron Stein, Laguna Niguel, CA (US)

(73) Assignee: Airsept, Inc., Atlanta, GA (US)

( * ) Notice: Subject to any disclaimer, the term of this patent is extended or adjusted under 35 U.S.C. 154(b) by 166 days.

(21) Appl. No.: 13/765,070

(22) Filed: Feb. 12, 2013

(65) Prior Publication Data

US 2013/0220432 A1    Aug. 29, 2013

Related U.S. Application Data

(60) Provisional application No. 61/604,762, filed on Feb. 29, 2012.

(51) Int. Cl.
*F16K 31/08* (2006.01)
*F16K 31/06* (2006.01)

(52) U.S. Cl.
CPC ......... *F16K 31/0665* (2013.01); *F16K 31/0662* (2013.01); *F16K 31/082* (2013.01); *Y10T 137/0368* (2015.04); *Y10T 137/7759* (2015.04)

(58) Field of Classification Search
CPC ............... G05D 7/0635; G05D 16/202; F16K 31/0651; F16K 31/0662

USPC ............. 137/486, 487.5; 251/129.01, 129.05, 251/129.08, 129.14, 129.21, 65; 3/486, 3/487.5

See application file for complete search history.

(56) References Cited

U.S. PATENT DOCUMENTS

| | | | | |
|---|---|---|---|---|
| 2,391,017 | A * | 12/1945 | Grontkowski | 251/129.02 |
| 3,245,652 | A * | 4/1966 | Roth | 251/129.14 |
| 3,552,437 | A * | 1/1971 | Blosser et al. | 137/625.4 |
| 3,865,312 | A * | 2/1975 | Lombard et al. | 239/585.1 |
| 4,252,094 | A * | 2/1981 | Draxler | 123/198 DB |
| 4,489,863 | A * | 12/1984 | Horchos et al. | 222/504 |
| 7,481,416 | B2 * | 1/2009 | Neuhaus | 251/129.14 |
| 2011/0114862 | A1 * | 5/2011 | Zimmermann et al. | 251/149.6 |

OTHER PUBLICATIONS

"Mount", http://www.merriam-webster.com/dictionary/mount. Jul. 31, 2014.*

* cited by examiner

*Primary Examiner* — Kevin Murphy
*Assistant Examiner* — R. K. Arundale
(74) *Attorney, Agent, or Firm* — Womble Carlyle Sandridge & Rice LLP

(57) ABSTRACT

A fluid flow regulator has a body defining a tapered central passageway. A ferrous or magnetic ball is disposed within the central passageway and may be biased to a predetermined location within the passageway by a spring. An electromagnet is disposed at one end of the passageway. Varying electrical power to the electromagnet attracts or repels the ball thereby moving it to different locations within the tapered passageway to vary the flow through the passageway.

20 Claims, 2 Drawing Sheets

FLUID FLOW REGULATOR

REFERENCE TO RELATED APPLICATION

Priority is hereby claimed to the filing date of U.S. provisional patent application No. 61/604,762, filed on Feb. 29, 2012.

TECHNICAL FIELD

This patent disclosure relates generally to the regulation of fluid flows and more specifically, in one embodiment, to a method and apparatus for regulating a flow of coolant or other liquids in automotive applications.

BACKGROUND

Regulation of flows of fluids such as coolant through an automotive heat exchanger is accomplished with complex flow regulation devices incorporating solenoids, valves, and other components. Such devices are complex, expensive, and prone to failure. There is a need for a fluid flow regulator that is simple, inexpensive, and reliable for use in automotive applications. It is to the provision of such a fluid flow regulator that the present invention is directed.

SUMMARY

Briefly described, a fluid flow regulator has a body with a cylindrical outer surface and a conical inner surface defining a tapered central passageway. An annular electromagnet is disposed at one end of the body and the central opening of the electromagnet defines a seat. A ball made of a ferrous or magnetic material is disposed in the central passageway and is biased to a predetermined position within the passageway. The predetermined position may be intermediate the ends of the passageway or seated within the seat of the electromagnet. A sensor monitors the flow of a fluid through the passageway and provides this information to a voltage regulator coupled to the electromagnet. The voltage regulator supplies power to the electromagnet, which moves the ball within the passageway through magnetic attraction or repulsion. This changes the flow rate through the passageway due to the tapered wall of the passageway. Power supplied to the electromagnet can be varied to obtain a desired flow rate as indicated by the sensor.

DETAILED DESCRIPTION

Figure 1:
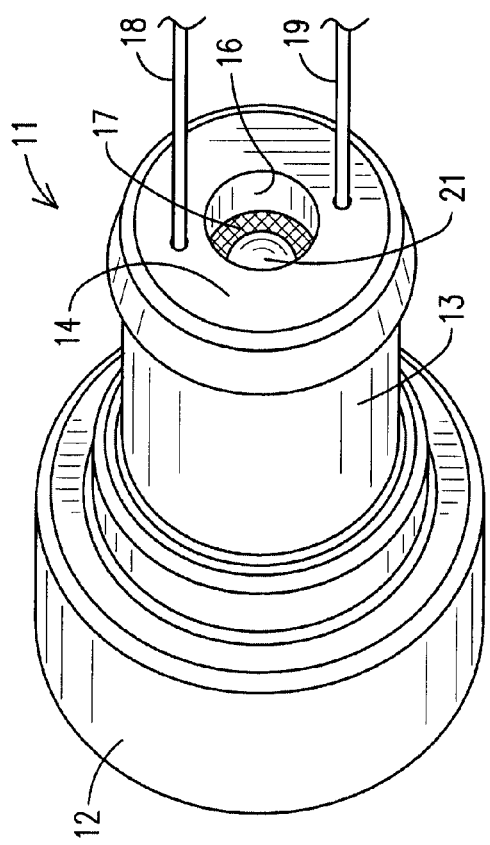
FIG. 1 is a perspective view of a heater barb within which the fluid flow regulator of this disclosure is incorporated.

Referring now in more detail to the drawing figures, wherein like reference numerals indicate like parts throughout the several views, FIG. 1 illustrates an example application of the fluid flow regulator of this invention. In this exemplary embodiment, the fluid flow regulator is mounted within a heater barb; however, it will be understood that this is only an example and the fluid flow regulator may be disposed in a fluid hose, in an in-line housing, or otherwise within a flow of fluid to be regulated. Thus, the invention is not limited to use in a heater barb as shown in the drawings.

In FIG. 1, a heater barb 11 has a base portion 12, a stem 13, and an end 14. An opening 16 is formed in the end 14 and communicates with an internal passageway 23 (FIG. 2) that extends through the heater barb and that communicates with an opening 22 formed at base portion 12. A fluid flow regulator according to the present invention is disposed within the passageway of the heater barb so that coolant flowing through the barb passes through the fluid flow regulator, as detailed below. A portion of the fluid flow regulator is visible in FIG. 1. More specifically, the toroidal or annular electromagnet 17 and ball 21 of the fluid flow regulator can be seen through the opening 16 in the end 14 of the stem 13.

Figure 2:
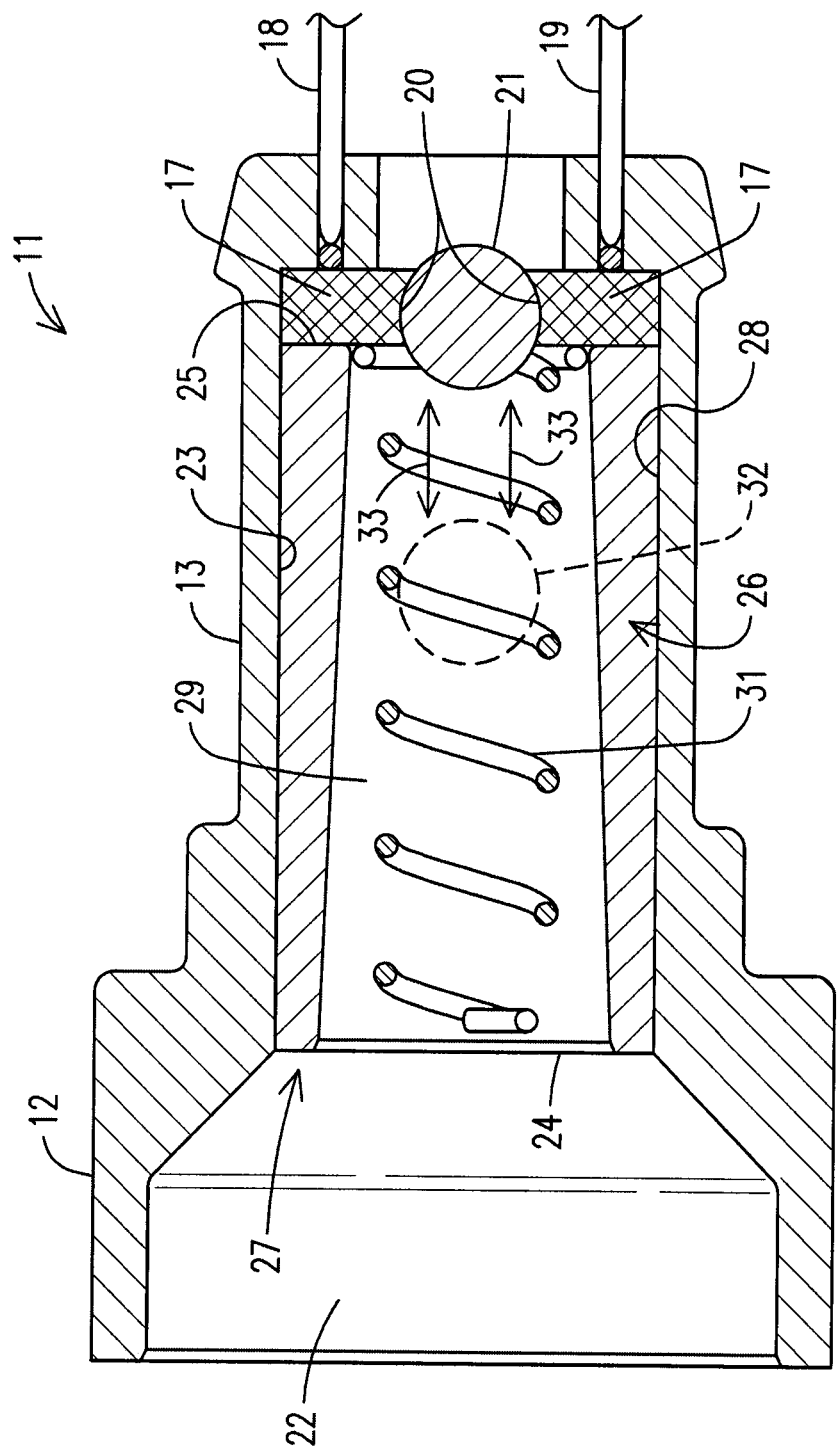
FIG. 2 is a cross sectional view of the heater barb showing the fluid flow regulator of this disclosure mounted therein.

FIG. 2 illustrates the configuration of the fluid flow regulator in this embodiment. The fluid flow regulator 27 comprises a body 26 defining a generally cylindrical outer wall 28 and a tapered or conical inner wall 29 that defines a central passageway through the body. Thus, the cross-sectional area of the opening defined by the central passageway 29 at its end 25 is smaller than that of the opening defined by the central passageway 29 at its opposite end 24. Opposed ends of the body 26 are coterminous with the corresponding ends 24, 25. The annular electromagnet 17 is secured at one end of the body 26 and is formed with a central opening 20 shaped to define a seat. The ball 21 is disposed and moveable within the central passageway 29 of the body in the direction indicated by arrows 33, and may be shaped such that the ball can be seated within the seat of the electromagnet as shown. The ball 21 is mounted at the end of a spring 31 that also is disposed within the central passageway of the body. The spring 31 may be configured to bias the ball 21 against the seat of the electromagnet. Alternatively, the spring 31 may be configured to bias the ball 21 to an axial position within the central passageway intermediate the ends 24 and 25 thereof. Such a position is illustrated at 32 in FIG. 2 in phantom line. Wires 18 and 19 are electrically connected to the electromagnet, which contains coils of wire, such that electrical power supplied to the electromagnet generates a magnetic field in the vicinity of the electromagnet. Varying the voltage and current of the electrical power varies the strength of the magnetic field.

The ball may be formed of a ferrous material such as steel that is attracted by a magnetic field. In such an embodiment, it will be seen that when the ball is biased to an intermediate axial position as shown at 32, activation of the electromagnet attracts the ball toward the electromagnet, causing the spring to stretch and causing the ball to move toward the second end 25 of the passageway 29. Varying the electrical power supplied to the electromagnet creates a stronger or weaker magnetic field, and the ball 32 is attracted more or less correspondingly. It will thus be seen that the axial position of the ball 32 within the passageway 29 can be controlled by controlling the electrical power supplied to the electromagnet.

The inner wall 29 of the central passageway is tapered or conical in cross-section or otherwise varies in diameter along the length of the passageway as mentioned above. Thus, when the ball is axially positioned at a larger diameter portion of the passageway, more space is defined between the ball and the wall of the passageway and more fluid can flow around the ball and through the passageway. Conversely, when the ball is axially positioned at a smaller diameter portion of the central passageway, less space is defined between the ball and the wall of the passageway and less fluid can flow around the ball and through the passageway. It will therefore be clear to the skilled artisan that fluid flow through the central passageway can be controlled by varying the electrical power supplied to the electromagnet, which, in turn, varies the axial position of the ball 32 within the tapered central passageway.

In another embodiment, the ball 21 can be made of a magnetic material having its own magnetic field. In such an embodiment, the ball can be oriented in the passageway with its magnetic field aligned with the magnetic field created by the electromagnet. This allows the ball 21 to be attracted toward the electromagnet when the polarity of the electrical power is in one state and repelled from the electromagnet when the polarity of the electrical power is in the opposite state. Thus, the axial position of the ball in this embodiment can be controlled by controlling both the power supplied to the electromagnet and the polarity of the supplied power. Alternatively, the polarity can be fixed to repel the ball only, and the ball 21 can be biased by the spring into engagement with the seat 20 of the electromagnet shutting off flow through the central passageway. The axial position of the ball and thus rate of flow can then be controlled by varying the power supplied to the electromagnet to repel the magnetic ball to a desired location within the passageway.

Figure 3:
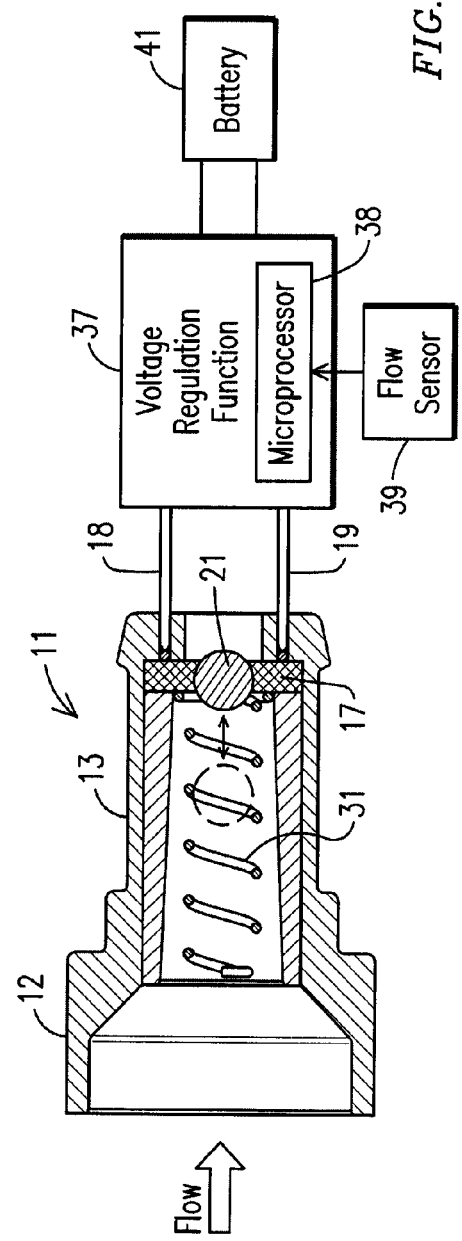
FIG. 3 illustrates the sensor and control circuitry that regulates power to the fluid flow regulator to establish a desired flow rate therethrough.

FIG. 3 illustrates one embodiment of control circuitry for controlling the flow rate through the fluid flow regulator of this invention. A voltage regulation function or circuit includes a microprocessor or micro controller MP and is powered ultimately by a battery 41. A flow sensor 39 is located at a predetermined location within the fluid flow and generates a signal indicative of the flow rate. This signal is provided from the sensor to the microprocessor of the voltage regulation function, which can compare this to a desired flow rate. If the sensed flow rate is greater than the desired flow rate, then the power to the electromagnet 17 can be varied to move the ball 21 toward a smaller diameter location within the central passageway to reduce the flow rate until the sensor indicates that the desired rate has been obtained. If the sensed flow rate is less than the desired flow rate, then power to the electromagnet can be varied to move the ball 21 toward a larger diameter location within the central thereby increasing flow rate until the sensor indicates that the desired rate has been obtained. In this way, flow rate can be controlled and the control can be dynamic to meet varying demands on the system. For example, when used to vary flow of coolant through the heater coil of a vehicle, the flow rate might be increased when passengers call for more heat or reduced when they call for less heat.

The invention has been described herein in terms of preferred embodiments and methodologies considered by the inventors to represent the best mode of carrying out the invention. It will be understood by the skilled artisan; however, that a wide range of additions, deletions, and modifications, both subtle and gross, may be made to the illustrated and exemplary embodiments without departing from the spirit and scope of the invention. For example, while the fluid flow regulator has been described within the context of regulating automotive fluids, its application is not so limited and regulation of any fluids, be they liquid or gas, in other environments such as medical devices, home air conditioning systems, plumbing applications, and the like are within the scope of the invention. The electromagnet in the illustrated embodiment is shown at the narrow diameter end of the fluid flow regulator; however, it may just as well be located at the wider diameter end or, indeed, intermediate the ends of the fluid flow regulator. Shapes, sizes, tapers, and other features may be varied from those illustrated to meet application specific requirements. The skilled artisan might well make these and other modifications within the scope of the invention.

What is claimed is:

1. A fluid flow regulator, comprising:
   a body having a first end, a second end opposite said first end, and a central passageway formed in said body to admit fluid flow through said body;
   said central passageway extending from said first end to said second end and defining a first opening at said first end and a second opening at said second end, and including a tapered portion between said first opening and said second opening;
   a magnetically-interactive moveable object disposed within said central passageway and axially translatable within said tapered portion to define a variable area between said movable object and said tapered portion that controls the flow of fluid through said tapered portion;
   an electromagnet secured in an end-to-end relationship to one of said first end and said second end and operable to control an axial position of said movable object within said tapered portion, said electromagnet having an annular shape with a central opening to admit said fluid flow through said electromagnet; and
   a biasing member within said central passageway, said member biasing said moveable object to a predetermined axial position within said central passageway.

2. The fluid flow regulator of claim 1, wherein said body defines a generally cylindrical outer wall and said central passageway has a conical cross-sectional shape.

3. The fluid flow regulator of claim 2, wherein said moveable object is a ball mounted to said biasing member.

4. The fluid flow regulator of claim 1, wherein said predetermined axial position is intermediate said first end and said second end.

5. The fluid flow regulator of claim 1, wherein said central opening through said electromagnet is shaped to define a seat to receive said movable object and close said central passageway.

6. The fluid flow regulator of claim 5, wherein an area of said first opening of said body is greater than an area of said second opening of said body.

7. The fluid flow regulator of claim 5, wherein said predetermined axial position is a point along said central passageway at which said moveable object contacts said seat.

8. The fluid flow regulator of claim 5, wherein said predetermined axial position is intermediate said first end and said second end.

9. The fluid flow regulator of claim 5, further comprising:
   a sensor located within the fluid flow;
   a microprocessor in electrical communication with said sensor and said electromagnet; and
   a power supply in electrical communication with said microprocessor,
   wherein said microprocessor is operable to vary a voltage to said electromagnet in response to a measurement from said sensor.

10. The fluid flow regulator of claim 1, wherein said magnetically-interactive moveable object is made from a ferrous material.

11. The fluid flow regulator of claim 1, wherein said magnetically-interactive moveable object is made from a magnetic material having its own magnetic field.

12. A method of regulating a fluid flow, comprising the steps of:
   providing a body having a first end, a second end opposite the first end, and a central passageway extending from said first end to said second end and defining a first opening at said first end and a second opening at said second end, said central passageway including a tapered portion between said first opening and said second opening;

securing an electromagnet in an end-to-end relationship to one of said first end and said second end, said electromagnet having an annular shape with a central opening to admit said fluid flow through said electromagnet, said electromagnet being operable to control an axial position of a magnetically-interactive movable object within said tapered portion;

installing said moveable object within said central passageway, said movable object being axially translatable within said tapered portion to define a variable area between said movable object and said tapered portion that controls the flow of fluid through said tapered portion;

installing a biasing member within said central passageway configured to bias said moveable object to a predetermined axial position within said central passageway;

admitting a flow of fluid through said central passageway; and powering said electromagnet to vary said axial position of said moveable member within said tapered portion to regulate said flow of fluid through said central passageway.

13. The method of claim 12, wherein said predetermined axial position is intermediate said first end and said second end.

14. The method of claim 12, wherein powering said electromagnet further comprises:
   supplying electrical power to said electromagnet to generate a magnetic field in the vicinity of said electromagnet, said electrical power having a voltage and a current; and
   varying said voltage and said current to vary the strength of said magnetic field.

15. The method of claim 12, wherein powering said electromagnet further comprises:
   sensing a rate of flow of fluid through said central passageway, said rate becoming a sensed rate;
   generating a signal indicative of said sensed rate;
   sending said signal to a microprocessor;
   causing said microprocessor to compare said signal to a desired flow rate; and
   varying the electrical power to said electromagnet depending on whether said sensed flow rate is greater than or less than said desired flow rate.

16. The method of claim 12, wherein an area of said first opening of said body is greater than an area of said second opening of said body.

17. The method of claim 16, wherein varying the axial position of said moveable member within said tapered portion further comprises moving said movable member toward said second opening to reduce fluid flow through said central passageway until said sensed rate matches said desired flow rate.

18. The method of claim 16, wherein varying the axial position of said moveable object within said tapered portion further comprises the moving said movable member toward said first opening to increase fluid flow through said central passageway until said sensed rate matches said desired flow rate.

19. A heater barb assembly for regulating a flow of fluid through a heat exchanger, the heater barb assembly comprising:
   a first body comprising a base portion and a stem extending from said base portion, said first body having an internal passageway formed therein and said stem terminating in an end having an opening that communicates with said internal passageway;
   a second body housed within said internal passageway, said second body having a first end, a second end opposite the first end, and a central passageway formed in said second body, said central passageway communicating with said opening in said stem to admit fluid flow through said second body;
   said central passageway extending from said first end to said second end and defining a first opening at said first end and a second opening at said second end, and including a tapered portion between said first opening and said second opening;
   a magnetically-interactive moveable object disposed within said central passageway and axially translatable within said tapered portion to define a variable area between said movable object and said tapered portion that controls the flow of fluid through said tapered portion;
   a biasing member within said central passageway, said member biasing said moveable object to a predetermined axial position within said central passageway; and
   an electromagnet secured in an end-to-end relationship to one of said first end and said second end and operable to control an axial position of said movable object within said tapered portion, said electromagnet having an annular shape with a central opening to admit said fluid flow through said electromagnet, wherein said central opening is shaped to define a seat to receive said movable object and close said central passageway.

20. The heater barb assembly of claim 19, further comprising:
   a sensor located within the fluid flow;
   a microprocessor in electrical communication with said sensor and said electromagnet; and
   a power supply in electrical communication with said microprocessor,
   wherein said microprocessor is operable to vary a voltage to said electromagnet in response to a measurement from said sensor.

* * * * *